Figure 1:
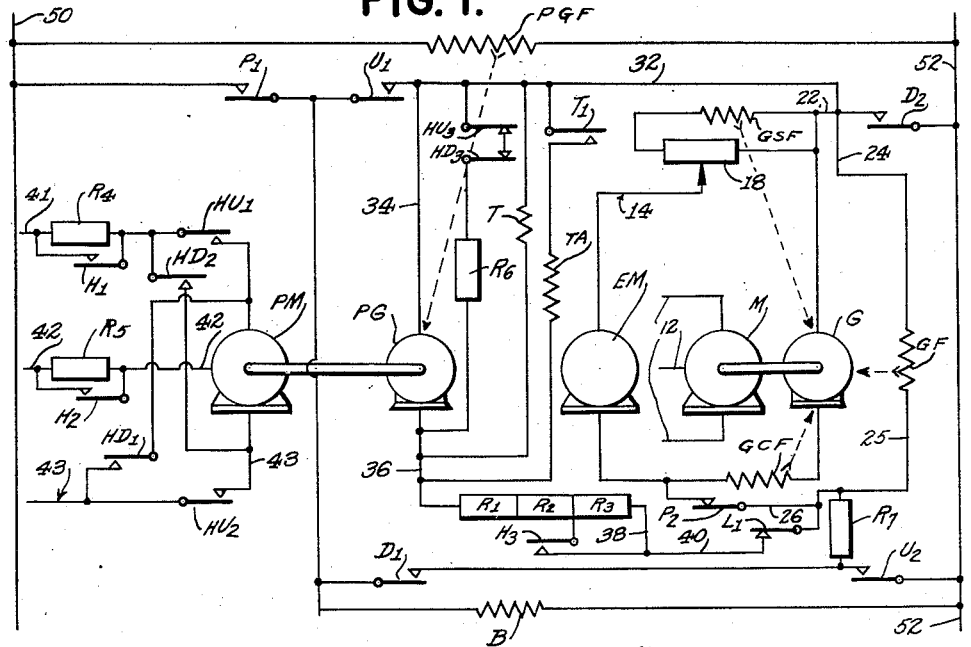

March 9, 1943.　　　K. M. WHITE　　　2,313,607

VARIABLE VOLTAGE ELEVATOR CONTROL

Filed Nov. 24, 1941

INVENTOR.
KENNETH M. WHITE
BY Hoguet, Neary & Campbell
ATTORNEYS

Patented Mar. 9, 1943

2,313,607

UNITED STATES PATENT OFFICE 2,313,607

VARIABLE VOLTAGE ELEVATOR CONTROL

Kenneth M. White, Louisville, Ky., assignor to American Elevator & Machine Company, Louisville, Ky., a corporation of Kentucky Application November 24, 1941, Serial No. 420,272

13 Claims. (Cl. 172—152)

The present invention relates to elevator systems and more particularly to a variable voltage control for an elevator by which the elevator can be given smooth, stepless and variable acceleration and retardation.

In variable voltage elevator systems heretofore proposed, the speed of the elevator motor is accelerated or retarded by operation of a rheostat usually located in a field of the main generator which supplies power to the elevator motor. An increase of the voltage and therefore the current in the field of the generator, for example, increases the output voltage of the generator which in turn accelerates the speed of the elevator motor. Increases or decreases of current produced by operation of the field rheostat, as heretofore practiced, result in a series of abrupt changes in speed, that is to say, a sudden step-like change in speed occurs each time the rheostat is moved to another point of contact.

The present invention overcomes this objectionable step-like acceleration or retardation by enabling the operator to effect smooth, stepless increases and decreases in the power supplied to the elevator motor.

More particularly the present invention provides for rapid and smooth changes in the voltage applied across a field of the main generator by providing the elevator controls with a small pilot motor-generator set, the output voltage of which is applied across such field. In one embodiment of the invention the field current of the pilot generator is maintained constant and the voltage output thereof is varied by changing its speed of operation. The speed of the pilot generator is determined by the operation of the pilot motor which may be increased from standstill to full speed according to the time desired for acceleration of the elevator to full speed.

The acceleration of the pilot motor may be, if desired, controlled by a suitable arrangement of starting resistances which can be cut out as the motor gains in speed.

Smooth and rapid retardation of the elevator is obtained by disconnecting the power to the pilot motor, leaving the pilot motor-generator set to coast. As the speed of the pilot generator decreases the voltage across the main generator field decreases and the speed of the elevator is decreased accordingly. The rate of retardation of the elevator may be further controlled by connecting across the pilot generator a resistance of desired value to cause a dynamic braking effect upon the pilot motor-generator set.

While in one embodiment of the invention the field of the pilot generator is provided with a constant current, in another embodiment of the invention I connect an additional field of the pilot generator in the armature circuit of the main generator. In the latter embodiment, the pilot generator assists the series field of the main generator in regulation of the voltage for the elevator motor for changes in elevator loads. This is particularly helpful for high speed elevators when the voltage regulation of the series field is insufficient to maintain uniform high operating speeds for different elevator loads. With the field of the pilot generator connected in the main generator circuit, the voltage of the pilot generator is boosted by an amount proportional to increases in the current of or load on the main generator. Increases in pilot generator voltage in turn increase the voltage across the main generator shunt field across which the pilot generator is connected, thereby augmenting the main generator series field to maintain substantially uniform the operating characteristics of the elevator regardless of changes in elevator loads.

Figure 2:
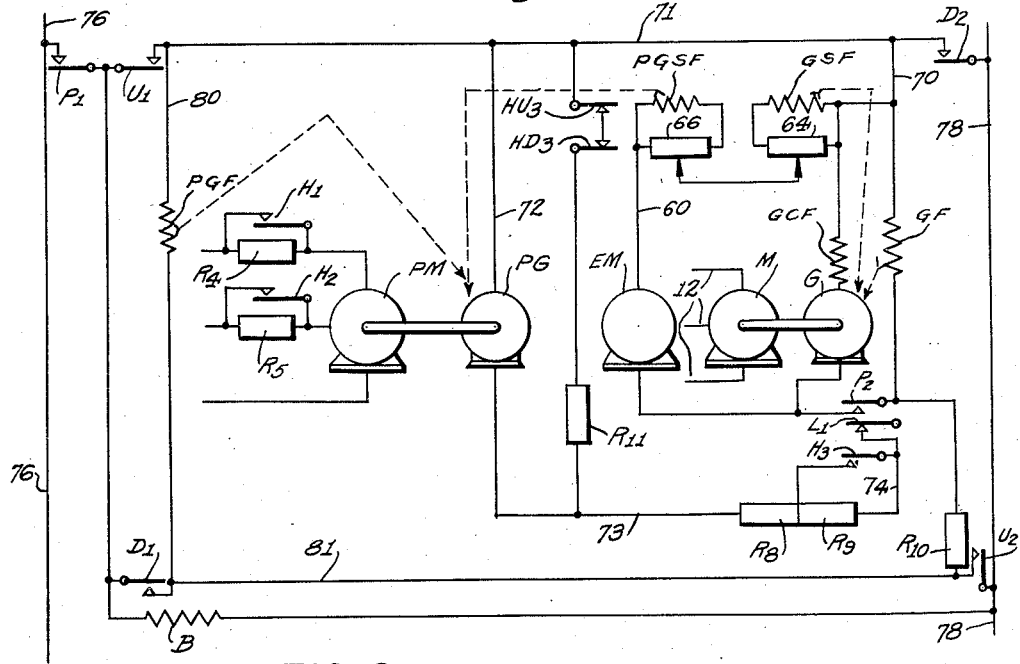

For a better understanding of the invention, reference is had to the following detailed description to be read in connection with the accompanying drawing, in which:

Fig. 1 is a fragmentary diagrammatical illustration of an elevator system embodying one form of the present invention; and Fig. 2 is a fragmentary diagrammatical illustration of the elevator system embodying another form of the invention.

Referring to Figs. 1 and 2 of the drawing, I have shown for purposes of illustration that portion only of the control circuits of elevator systems with which a pilot motor-generator set of the present invention is directly associated. It will be understood, of course, that each of the embodiments of the invention illustrated is applicable to any elevator system having the usual motor-generator set for supplying power to the elevator motor.

Referring more particularly to Fig. 1 of the drawing, the elevator system is shown to be provided with a direct current elevator motor EM which is supplied by a main motor-generator set comprising a generator G and a motor M. The motor M is connected by wires 12 to any suitable source of power. The generator G is connected to the elevator motor EM by a loop circuit 14 which includes a series field GSF, the flow of current through which is controlled by a rheostat 18, and a compound field winding GCF. Connected to the loop circuit 14 by wires 22, 24, 25 and 26 and contact P₂ is a shunt field GF for the main generator G.

To control the current in the shunt field GF according to the present invention, I connect across the shunt field GF a small generator PG of a pilot motor-generator set. The circuit connecting the pilot generator may be traced from wire 24 through wires 32, 34, 36, resistances $R_1$, $R_2$, $R_3$, wires 38 and 40, contacts $L_1$ and wire 25. The pilot generator is driven by a pilot motor PM which is connected by wires 41, 42 and 43 to a suitable source of power. These wires may be provided with starting resistances $R_4$, and $R_5$ which are adapted to be cut out at a predetermined speed of the motor by relay contacts $H_1$ and $H_2$. The wires 41 and 43 are interconnected by relay contacts $HU_1$, $HD_1$ and $HU_2$ and $HD_2$ which control the direction of rotation of the pilot motor-generator set and thereby the direction of current flow in the shunt field GF of the main generator G. When the relay contacts $HU_1$ and $HU_2$ are closed the motor EM is so energized as to move the elevator upwardly and when the relay contacts $HD_1$ and $HD_2$ are closed, the motor operation will be reversed to move the elevator downwardly.

The circuit, as shown in Fig. 1, is provided with suitable connections and relay contacts between the leads 50 and 52 necessary to control the operation of the pilot and main motor-generator sets. Such relay contacts may include the potential relay contacts $P_1$ and $P_2$, directional relay contacts $U_1$, $U_2$, $D_1$ and $D_2$, leveling relay contacts $L_1$, the usual brake solenoid B, the accelerating relay contacts $H_1$, $H_2$ and $H_3$ and relays T and TA for timing the acceleration. A resistance $R_6$ is also shown together with relay contacts $HU_3$ and $HD_3$ connected across the armature of the pilot generator, the purpose of which will be described hereinafter. A constant current field PGF for the pilot generator PG is connected across the leads 50 and 52.

The operation of the variable voltage control may best be illustrated by an example of operation such as starting from a standstill position. When the usual starting control of the elevator system is actuated, assuming that the motor M of the main motor-generator set is in operation and that the potential and directional relays P, U and HU (not shown) are energized by such actuation of the control, current will be delivered by the closing of relay contacts $HU_1$ and $HU_2$ to the pilot motor PM through the starting resistances $R_4$ and $R_5$ to start operation of the pilot generator PG.

As the pilot generator increases in speed, the voltage generated thereby and applied across the shunt field GF increases directly in proportion to the acceleration of the pilot generator. The increasing voltage across the shunt field GF increases proportionately the voltage supplied through the loop circuit 14 to the elevator motor EM by the constant speed generator G. The elevator motor is thereby accelerated in speed which acceleration is proportional to the mounting voltage of the pilot generator. When the pilot motor generator set reaches a predetermined speed, say about half speed, the relay contacts $H_1$, $H_2$ and $H_3$ are actuated, whereupon the starting resistances $R_4$ and $R_5$ are cut out of the pilot motor circuit and the resistance $R_3$ is cut out of the generator shunt field circuit, thereby permitting the pilot motor-generator set to continue accelerating in speed until full speed is reached. The continued acceleration of the pilot generator results in a continued accelerating of the elevator motor until maximum speed is reached.

When it is desirable to retard the movement of the elevator, the relay contacts $HU_1$ and $HU_2$ are opened. This cuts off the supply of power to the pilot motor, thereby permitting the pilot motor-generator set to coast. This will cause a retardation in the speed of the pilot generator, thereby reducing the voltage applied across the shunt field GF to result in a smooth retardation of the elevator motor.

The retardation of the elevator motor may be further controlled and increased by causing a resistance to be thrown in across the armature of the pilot generator. The relay contacts $HU_3$ and $HD_3$ and the resistance $R_6$ are provided for this purpose. This resistance, which may be of any desired value and variable if desired, produces a dynamic braking effect upon the pilot motor-generator set. Thus, the less the resistance $R_6$ the greater the braking effect it will produce when the contacts $HU_3$ or $HD_3$ are closed.

The pilot motor generator set is adjusted to stop as the elevator enters the leveling zone at a reduced speed of about 80 feet per minute. The speed of the elevator is thereafter further decreased by low voltage control of the main generator field GF through the operation of the leveling relays of any well known leveling system that may be selected for the system. When the elevator reaches the leveling zone a relay of the leveling system opens the contacts $L_1$ and thereby disconnects the armature circuit of the pilot generator from the shunt field GF and connects the field GF across the usual exciter voltage of the system through a resistance $R_7$ across the leads 50, 52.

When the car is about three-quarters of an inch from the floor level and the speed is approximately 20 feet per minute, the directional and potential relays drop out, opening contacts $U_1$, $U_2$ and $P_1$. This opens the main generator shunt field and deenergizes the brake solenoid B, thereby causing the brake to hold the elevator in stopped position. Also, at the same time, $P_2$ closes and connects shunt field GF across the generator armature in such a way that the voltage produced by residual magnetism in the generator will produce a demagnetizing effect in the generator field. Thus the circulating current in the loop circuit will be kept at a minimum.

The reversal of the elevator motor may be accomplished by reversing the pilot motor-generator set. This operation is effected by actuating the accelerating relay contacts $H_1$, $H_2$ and $H_3$ to reinsert the starting resistances $R_4$ and $R_5$ in the motor circuit, and to reinsert the resistance $R_3$ in the armature circuit of the pilot generator. After this, the direction of operation of the pilot motor-generator set is reversed by a reversal of the wires 41 and 43 brought about by the opening of the relay contacts $HU_1$ and $HU_2$ and the closing of the relay contacts $HD_1$ and $HD_2$. As the pilot motor slows down to a stop and then accelerates to full speed in the reverse direction, the elevator likewise decelerates to a stop, reverses and accelerates to full speed in the opposite direction.

The foregoing embodiment of the invention is particularly suitable for speeds up to the usual maximum elevator speed of about 400 feet per minute. For this maximum speed the series field GSF of the main generator provides ample voltage regulation for the main generator G for changes in elevator loads so as to maintain substantially uniform elevator speed operations for different loads. For elevators designed to operate at much higher maximum speeds, the series field GSF of the circuit in Fig. 1 provides, for most systems, insufficient voltage regulation.

For the higher speed elevator systems I connect an additional field of the pilot generator in the armature circuit of the main generator so that the pilot generator will augment the series field of the main generator and thereby assist in the regulation of the main generator voltage in accordance with changes in elevator loads.

Referring to Fig. 2 of the drawing, I have shown diagrammatically the alternative connections for the circuit of elevators intended for maximum speeds above 400 feet per minute. It will be understood, however, that the circuit illustrated in Fig. 2 may be used for elevator systems having a maximum speed in the neighborhood of 400 feet per minute as well as for much higher speeds.

For the sake of brevity I have used in Fig. 2 the same reference characters used in Fig. 1 wherever the elements of the system are identical in structure and functional relationship.

The main generator G is driven by the motor M to provide direct current for the elevator motor EM, the same as in the illustration of Fig. 1. The armature circuit of the generator G is connected in a loop circuit 60 which includes the elevator motor EM, a compound field GCF and a variable series field GSF with rheostat 64 for the generator G. Connected in the loop circuit 60 is a field PGSF and a rheostat 68 for the pilot generator PG. The current of the field PGSF of the pilot generator has a current flow which is proportional to the current of the main generator G.

The pilot motor PM which is supplied with current through starting resistances R4 and R5 is operated similarly as in the embodiment illustrated in Fig. 1. The motor PM, however, is not provided with reversible relay connections. When it is desirable to reverse the elevator the reversing of the current of the pilot generator and thereby the current in the loop circuit is accomplished by control of the directional relay contacts U1, U2 and D1, D2. The reversal in the closing of the relay contacts U1, U2 and D1, D2 effects a reversal of the current in the pilot generator field PGF. This causes reversal in the direction of the pilot generator voltage across the field GF, thereby reversing the current in the loop circuit 60 and this, of course, reverses the rotation of the motor EM.

Retardation in the circuit of Fig. 2 of the elevator motor EM is effected in the same manner as described in connection with the circuit of Fig. 1, the resistance R11 and retardation contacts HU3 and HD3 being shown for this purpose.

The shunt field GF of the main generator G is connected across the armature of the pilot generator by wires 70, 71, 72 and 73, resistances R8, R9, wire 74 and contacts L2. The circuit is provided with a resistance R10 which is utilized in the leveling operation of the elevator, the resistance being cut into the circuit in a well known manner to reduce the current of the shunt field GF for leveling as explained in connection with Fig. 1.

The operation of the variable voltage control illustrated in Fig. 2 starting from standstill position with potential relay contacts P1 and the directional relay contacts U1 and U2 closed, the brake solenoid B is energized to release the elevator brake. Current is supplied to the shunt field PGF of the pilot generator from lead 76 through contacts P1, U1, wires 80, 81 and the contacts U2 to the lead 78. The circuit connections for the armature of the pilot generator are connected across the shunt field GF of the main generator through the leveling contacts L1. As the pilot motor-generator set accelerates, the starting resistances R4, R5 and also R9 are cut out of the circuit by the closing of the contacts H1, H2 and H3 the same as described in connection with the circuit of Fig. 1.

Since the value of the armature current of the main generator and elevator motor circuit varies with the load on the elevator, the speed of the elevator motor is proportional to the voltage of the main generator minus the voltage drop in the loop circuit. Should the generator voltage be maintained constant, the speed of the elevator would decrease with increase of load. This effect on speed by changes in load can be adequately offset for speeds up to about 400 feet per minute by the voltage regulation of the main generator series field GSF of the circuit shown in Fig. 1. In the embodiment of Fig. 2 the effect on speed by changes in loads is offset by the combined voltage regulation of the series field GSF of the main generator and the series field PGSF of the pilot generator.

In the embodiment illustrated in Fig. 1 the series field of the main generator is ample to compensate for the drop of voltage in the loop circuit due to the increased loads, but for elevators for higher rated speeds the main generator field becomes more and more saturated so that the series field effect, which at low speeds was sufficient to maintain a constant speed regardless of the load on the elevator motor, becomes more and more inadequate as the speed exceeds 400 feet per minute. With the series field PGSF of the pilot generator connected as shown in Fig. 2 it carries the main generator current. The voltage produced in the pilot generator armature by the series field PGSF is applied across the main generator shunt field GF. This voltage will only be produced when the pilot generator is running and will be proportional to the speed of the pilot generator and the main generator current. Thus the pilot series field augments the series field of the main generator and maintains substantially uniform the higher speeds for different elevator loads.

This will become more apparent by considering the effect of large currents on the main generator series field. When the main generator series field becomes more and more saturated by magnetic flux due to increased currents as the speed increases, the series field effect, which at low speeds was sufficient to maintain a constant speed for changes in load, becomes more and more inadequate to do so as the speed increases. For low elevator speeds the pilot generator is stopped so that the series field effect comes only from the main generator series field GSF. As the pilot generator is started and accelerated the voltage of the main generator increases and the speed of the elevator also increases, but as it approaches higher and higher speeds the series field effect of the main generator series field GSF decreases. The series field PGSF of the pilot generator increases with increase in speed and also by increase in the current in the loop 60. The series field effect of the pilot generator therefore augments the series field effect of the main generator in a manner to produce a total series effect which is fairly constant for all speeds and particularly at the higher or maximum rated speed of the elevator.

From the foregoing it will be seen that the pilot motor-generator set in the embodiment illustrated in Fig. 2 not only effects smooth and rapid acceleration and retardation control of the elevator motor but also functions to augment the main generator series field voltage regulation to insure substantially uniform maximum speeds for high speed elevator systems for different loads.

While I have shown and described only two embodiments of my invention it will be readily apparent to those skilled in the art that many additional modifications and adaptations are possible without departing from the invention. It should therefore be understood that the embodiments of the invention herein illustrated and described are intended to be illustrative only and not as limiting the scope of the appended claims.

I claim:

1. A control for an elevator having an elevator motor and a motor-generator set to supply power for the elevator motor; said control comprising means to generate a voltage, means to apply the voltage across a field of the generator of said set, and means to vary the speed of operation of said voltage generating means so as to vary the voltage applied across said field and thereby control the operation of the elevator motor.

2. A control for an elevator having an elevator motor, a motor-generator set to supply power for the elevator motor and a shunt field for the generator; said control comprising means to generate a voltage, means to apply the voltage across said shunt field, and means to vary the speed of operation of the voltage generating means so as to vary the voltage across said field and thereby vary the power supplied to said elevator motor to effect controlled acceleration and deceleration of the elevator.

3. A control for an elevator having an elevator motor and a motor-generator set to supply power for the elevator motor; said control comprising means including a field winding connected in the circuit of the elevator motor to generate voltage for application across a field of the generator of said set and, means to vary the speed of operation of said voltage generating means, whereby the operation of said elevator motor is controlled by the joint effect of the current in the elevator motor circuit and the speed of operation of said voltage generating means.

4. A control for an elevator having an elevator motor and a main motor-generator set to supply power for the elevator motor; said control comprising a pilot motor-generator set, means to apply voltage generated by the pilot generator across a field of the main generator, and means to vary the speed of the pilot motor to vary the voltage applied to said field.

5. A control for an elevator having an elevator motor and a main motor-generator set to supply power for the elevator motor; said control comprising a pilot motor-generator set, means to apply voltage generated by the pilot generator across a field of the main generator, means to control the acceleration and retardation of said pilot motor to effect smooth increases and decreases in the voltage applied across the said field of said main generator.

6. A control for an elevator having an elevator motor and a main motor-generator set to supply power for the elevator motor; said control comprising a pilot motor-generator set, means to apply the voltage generated by the pilot generator across a field of said main generator, means to vary the speed of the pilot motor to vary the voltage applied to said field, and said last named means including a resistance applicable across the armature of the pilot generator to apply dynamic braking on the pilot motor-generator set and thereby decrease the power supply for the elevator motor to effect deceleration thereof.

7. A control for an elevator having an elevator motor and a main motor-generator set to supply power for the elevator motor; said control comprising a pilot motor-generator set, means to apply the voltage generated by the pilot generator across a field of said main generator, and means to selectively connect said pilot motor for operation in either direction and thereby determine the directional operation of the elevator motor.

8. A control for an elevator having an elevator motor and a main motor-generator set to supply power for the elevator motor; said control comprising a pilot motor-generator set, means to apply the voltage generated by the pilot generator across a field of said main generator, and means to reversely connect the field winding of the pilot generator and thereby determine the directional operation of the elevator motor.

9. A control for an elevator having an elevator motor and a main motor-generator set to supply power for the elevated motor; said control comprising a pilot motor-generator set, means to apply the voltage generated by the pilot generator across a field of said main generator, means to selectively connect said pilot motor for operation in either direction and thereby determine the directional operation of the elevator motor, and means to vary the speed of the pilot motor to vary the voltage applied to said field.

10. A control for an elevator having an elevator motor, a main motor-generator set to supply power for the elevator motor and leveling control means for the elevator; said control comprising a pilot motor-generator set, means to apply voltage generated by the pilot generator across a field of said main generator, means to vary the speed of the pilot motor to vary the voltage applied to said field and means to transfer the connections of said field from the pilot generator to the leveling control means when the speed of the elevator has decelerated to a predetermined low speed for stopping purposes.

11. A control for an elevator having an elevator motor, a main motor-generator set to supply power to the elevator motor and series and shunt field windings for said generator; said control comprising means to generate a voltage, means to apply the voltage across said shunt field, and means to vary the speed of operation of the voltage generating means so as to vary the power supplied to said elevator motor and thereby effect controlled acceleration and deceleration of the elevator, the series field being adapted to provide voltage regulation for the generator to maintain substantially uniform speed characteristics for the elevator motor for different elevator loads.

12. A control for an elevator having an elevator motor, a main motor-generator set to supply power for the elevator motor and a shunt field for the generator; said control comprising a pilot motor-generator set, a field winding for said pilot generator connected in circuit with the elevator motor, means to apply voltage generated by the pilot generator across said shunt field, whereby the shunt field is subjected to a voltage which is proportional to the speed of the pilot generator and the main generator current.

13. A control for an elevator having an elevator motor, a main motor-generator set to supply power for the elevator motor and series and shunt field windings for the generator; said control comprising a pilot motor-generator set, a field winding for said pilot generator connected in circuit with the elevator motor, means to apply voltage generated by the pilot generator across said shunt field, whereby the shunt field is subjected to a voltage which is proportional to the speed of the pilot generator and the main generator current and thereby augment the generator voltage regulation function of said series field.

KENNETH M. WHITE.